United States Patent
Schuller et al.

[11] Patent Number: 6,161,466
[45] Date of Patent: Dec. 19, 2000

[54] PISTON PUMP FOR A VEHICLE BRAKE SYSTEM

[75] Inventors: Wolfgang Schuller, Sachsenheim; Andreas Weh, Durach; Tobias Fluck, Immenstadt, all of Germany

[73] Assignee: Robert Bosch GmbH, Stuttgart, Germany

[21] Appl. No.: 09/269,665

[22] PCT Filed: May 12, 1998

[86] PCT No.: PCT/DE98/01307

§ 371 Date: Jun. 14, 1999

§ 102(e) Date: Jun. 14, 1999

[87] PCT Pub. No.: WO90/06695

PCT Pub. Date: Feb. 11, 1999

[30] Foreign Application Priority Data

Jul. 30, 1997 [DE] Germany .......................... 197 32 812
Sep. 26, 1997 [DE] Germany .......................... 197 42 611

[51] Int. Cl.[7] .................................................. B70K 11/00
[52] U.S. Cl. ............................... 91/422; 92/256; 417/470; 417/549
[58] Field of Search ..................... 417/313, 470, 417/549; 60/453; 91/422; 92/172, 255, 256

[56] References Cited

U.S. PATENT DOCUMENTS

| | | | |
|---|---|---|---|
| 2,261,468 | 11/1941 | Harter | 417/549 X |
| 2,537,336 | 1/1951 | Ericson | 417/549 X |
| 3,024,731 | 3/1962 | Heintz | 417/549 X |
| 4,321,987 | 3/1982 | Dressell, Jr. et al. | 92/172 X |
| 5,123,819 | 6/1992 | Schuller et al. | 417/569 |
| 5,577,896 | 11/1996 | Harada | 417/549 X |
| 5,588,817 | 12/1996 | Zirps et al. | 417/549 |
| 5,628,625 | 5/1997 | Dokas | 417/549 X |
| 5,688,113 | 11/1997 | Bareiss et al. | 417/549 |
| 5,740,718 | 4/1998 | Rathweg | 92/255 X |
| 6,079,961 | 6/2000 | Schuller et al. | 417/549 |

*Primary Examiner*—John E. Ryznic
*Attorney, Agent, or Firm*—Ronald E. Greigg; Edwin E. Greigg

[57] ABSTRACT

The invention relates to a piston pump (10) with a piston (20) axially displaceable in a bush (12). In order to keep the piston (20) captive in the bush (12), the invention proposes that an annular loss-prevention means (90), with conically protruding spring tongues (96), be inserted in the manner of a snap connection into a V-shaped groove (80) in the bush (12), whose spring tongues (96) resiliently press a groove side (98) of a groove (34) made in the piston (40) into the groove (34), engaging it from behind, when the piston (20) is introduced into the bush (12). (FIG. 1)

14 Claims, 2 Drawing Sheets

PISTON PUMP FOR A VEHICLE BRAKE SYSTEM

PRIOR ART

The invention relates to a piston pump for a vehicle brake system.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

Many such piston pumps are known. As examples, the piston pumps known from German Patent Disclosures DE 41 07 979 A1 and DE 44 07 978 A1 can be named. These known piston pumps have a rodlike piston, which is axially displaceably guided in a bush. For driving the piston to a reciprocating stroke motion, an eccentric element that can be driven to rotate by an electric motor is used, which acts on the piston on a face end protruding from the bush. The bush is inserted into a cylinder bore of a pump housing.

For assembly of the known piston pumps, their pistons are introduced into the bush and are retained in the bush by installing a loss-prevention means. As the loss-prevention means, in the first of these references a rivet is inserted into a radial bore of the bush; the rivet protrudes inward and into an encompassing groove in the piston, which is wider by at least one piston stroke than a diameter of the rivet, and in this way secures the piston in the bush. In the second of these references, a sleeve is press-fitted into one end of the bush. This piston of this piston pump narrows at an annular shoulder at which the sleeve, press-fitted into the bush, holds the piston in the bush. After that, the bush is screwed or press-fitted into the cylinder bore of the pump housing and caulked. The assembly of the piston pump is made simpler by the loss-prevention means of the piston in the bush, especially in the piston pumps that have a piston restoring spring which presses the piston out of the bush.

ADVANTAGES OF THE INVENTION

The piston pump of the invention has the advantage that the loss-prevention means, upon introduction of the piston into the bush, snaps automatically into the piston or the bush and engages the undercut on its own; as a result, although the piston is pressed more deeply into the bush, still it cannot be pulled any farther out of the bush once the undercut strikes the loss-prevention means. This facilitates the captive introduction of the piston into the bush, compared with the known piston pumps. With the aid of the easily mounted loss-prevention means, a preassembled unit that includes the bush and the piston is obtained. The preassembled unit is sturdy and easily manipulated, and all its parts are held together in captive fashion. It can be inserted easily, for instance by press-fitting, into a cylinder bore of the pump housing.

Another advantage of the piston pump of the invention is that it requires no stepped piston for the loss-prevention means, as in the case of the piston pump known from DE 44 07 979 A1 named above; the piston can be guided at two axially spaced-apart points with the same guide diameter.

It is conversely also possible to realize the invention by mounting the loss-prevention means on the piston; upon insertion of the piston into the bush, the loss-prevention means automatically enters into engagement with the bush.

The undercut on the piston or the bush of the piston pump of the invention need not be embodied in encompassing fashion, that is, extending all the way around. Instead, for instance, it may be formed by one or more recesses distributed around the circumference of the piston or the bush.

In a preferred feature, the piston pump of the invention has a hollow-cylindrical filter, which is mounted on the bush, surrounding the piston, in the axial extension of the bush and which preferably integrally includes the loss-prevention means. This feature of the invention has the advantage that no separate component is needed as the loss-prevention means; instead, a filter of the piston pump simultaneously embodies the loss-prevention means as well.

In a further feature the hollow-cylindrical filter serves as a guide for the piston in the bush and keeps the piston aligned axially with the bush before the preassembled unit is inserted into the pump housing. This advantageously makes installing the parts that have to be installed in the pump housing substantially easier.

BRIEF DESCRIPTION OF THE DRAWINGS

The invention will be described in further detail in terms of a preferably selected exemplary embodiment shown in the drawings. Shown are.

DESCRIPTION OF THE EXEMPLARY EMBODIMENTS

Figure 1:
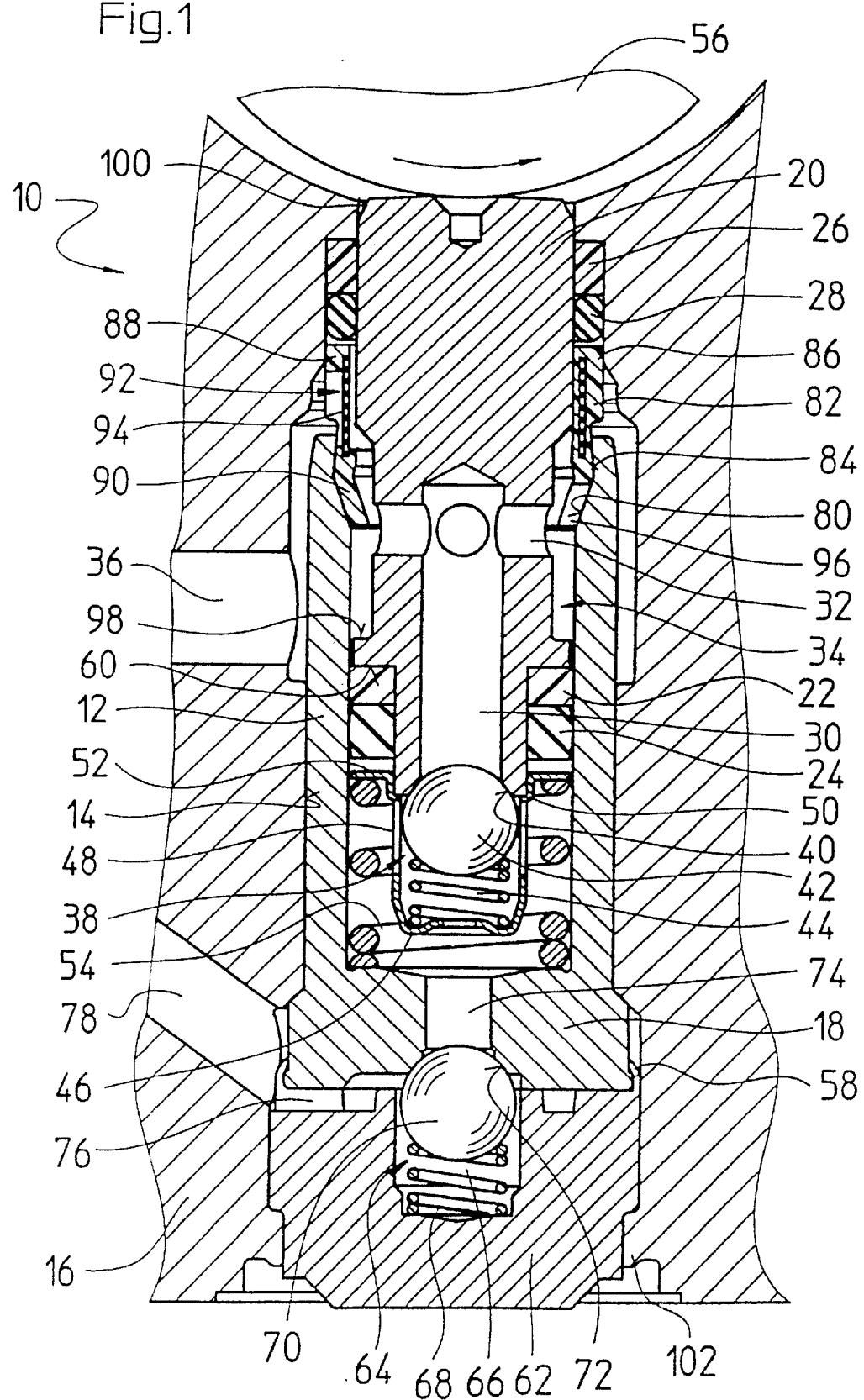
FIG. 1, an axial section through a piston pump of the invention.

The piston pump of the invention, identified overall by reference numeral 10 and shown in FIG. 1, has a bush 12, which is inserted into a stepped cylinder bore 14 of a hydraulic block, which forms a pump housing 16. The hydraulic block, of which only a fraction surrounding the piston pump 10 is shown in the drawing, is part of a slip-controlled hydraulic vehicle brake system, not otherwise shown. Besides the piston pump 10, other hydraulic components, such as magnet valves and hydraulic reservoirs, are inserted into the hydraulic block, and a master cylinder and wheel brake cylinders are connected in it. By means of the hydraulic block, the hydraulic components are hydraulically interconnected.

A boltlike piston 20 is received over approximately half its length in the bush 12. An end of the piston 20 located in the bush 12 is guided axially displaceably with a guide ring 22 on the inside surface of the bush 12 and is sealed off with a sealing ring 24. The other end of the piston 20, protruding from the bush 12, is guided axially displaceably directly in the cylinder bore 14 of the pump housing 16 by means of a guide ring 26 and is sealed off with a sealing ring 28 on the pump housing 16.

For fluid admission, the piston 20 is provided with an axial blind bore 30, from its end located in the bush 20, which is intersected near its bottom by transverse bores 32. A rated diameter of the piston 20 is equivalent to an inside diameter of the bush 12, and there is a clearance fit between the piston 20 and the bush 12; that is, with respect to the bush 12, the piston 20 has an undersize, which assures the axial displaceability of the piston 20. The blind bore 30 and the transverse bores 32 communicate, through a wide groove 34 in the circumference of the piston 20 and an open face end of the bush 12, with an inlet bore 36, which discharges radially to the piston pump 12 into the cylinder bore 14.

As its inlet valve 38, the piston pump 10 of the invention has a spring-loaded check valve, which is secured on the end of the piston 20 located in the bush 12: An orifice of the blind bore 30 is embodied as a conical valve seat 40, against which a valve ball 42, as a valve closing body, is pressed by a helical compression spring, as the valve closing spring 44. The valve closing spring 44 is supported on a bottom of a cup-shaped valve cage 46, which is made from sheet metal as a deep-drawn part and has openings 48. On its open side, the valve cage 46 has an encompassing annular shoulder 50, with which the valve cage rests on the face end of the piston 20 located in the bush 12, and a radial flange 52, at which the valve cage is pressed by a piston restoring spring 54 against the face end of the piston 20. The valve ball 42 and the valve closing spring 44 are received in the valve cage 46. The piston restoring spring 54 is embodied as stronger than the valve closing spring 44. The piston restoring spring 54 is supported against the bush bottom 18.

For driving the piston 20 to execute an axially reciprocating stroke motion, the piston pump 10 of the invention has an eccentric element 56, which can be driven to rotate by an electric motor, and against whose circumference the piston 20 is pressed by the piston restoring spring 54.

The guide ring 22, located in the bush 12, and the sealing ring 24 are fixed in the axial direction on the piston 20 between the radial flange 52 of the valve cage 46 and an annular shoulder 60 of the piston 20.

A cylindrical closure element 62 is seated on the bush bottom 18 and is connected by a crimp 58 to the bush 12. The closure element 62 serves the purpose of pressure-tight closure of the cylinder bore 14 and of fixing the bush 12 in the pump housing 16. An outlet valve 64 in the form of a spring-loaded check valve is accommodated in the closure element 62: the closure element 62 has a coaxial blind bore 66, into which a helical compression spring, as a valve closing spring 68, and a valve ball 70, as the valve closing body, are inserted. The valve ball 70 cooperates with a conical valve seat 72, which is mounted on an orifice of a center bore 74 that passes axially through the bush bottom 18. The valve seat 72 is formed and hardened by swaging. An outlet of fluid is effected through radial conduits 76 between the bush bottom 18 and the closure element 62, into a radial outlet bore 78 in the pump housing 16.

On an open end, the bush 12 is provided on its inside with a shallow, V-shaped groove 80. A hollow-cylindrical filter 82 is snapped into this V-shaped groove 80 and in the region of the V-shaped groove 80 has an encompassing bead 84, which has a V shape complementary to the V-shaped groove 80 of the bush 12. The V-shaped bead 84 of the filter 82 and the V-shaped groove 80 of the bush 12 form a snap connection.

Figure 2:
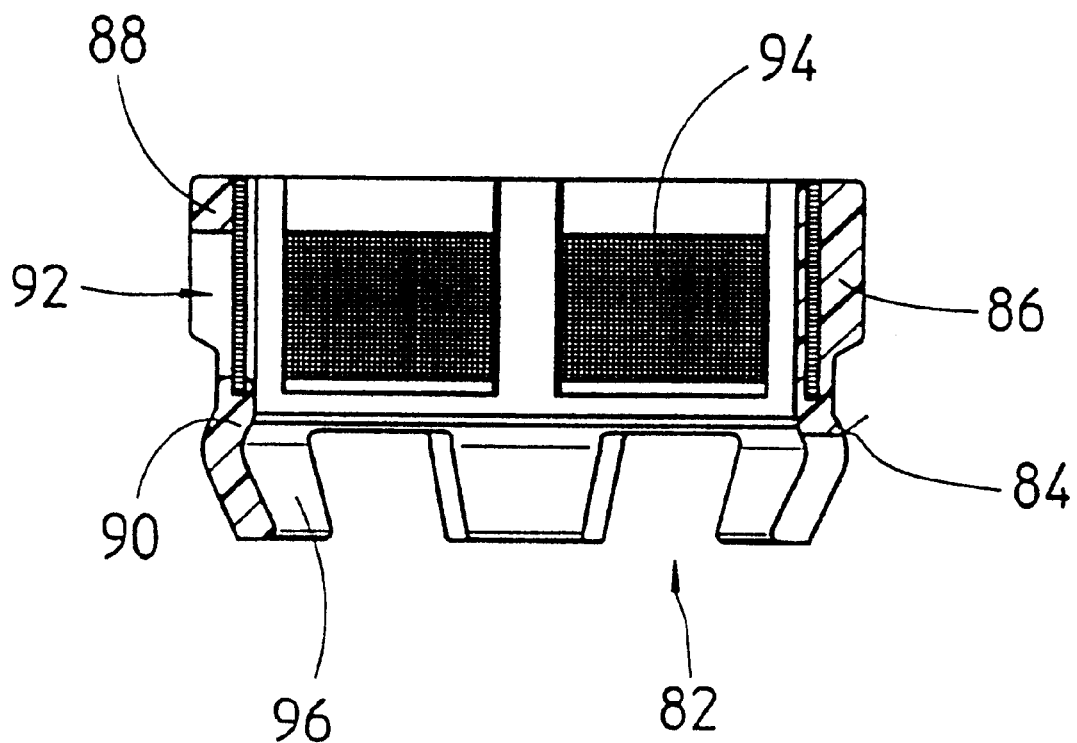
FIG. 2, an axial section through a loss-prevention means for the piston pump of FIG. 1, on a larger scale.

The filter 82 has a filter scaffold with axially parallel-extending filter struts 86, which are integral on their ends with two filter rings 88, 90 (FIG. 2). The filter scaffold with the filter struts 86 and the filter rings 88, 90 is a plastic injection-molded part. The filter struts 86 and the filter rings 88, 90 surround filter windows 92, into which a metal filter cloth 94 is inserted. The filter cloth 94 is tubular and is spray-coated with the filter scaffold 86, 88, 90.

One of the two filter rings 90 has the V-shaped bead 84, which rests in the V-shaped groove 80 in the bush 12. The filter struts 86 protrude away from the bush 12, axially lengthening the bush 12. The other filter ring 88 is held, axially spaced apart from the bush 12, by the filter struts 86 on the bush 12. This filter ring 88 forms a guide, which aligns the piston 20 coaxially in the bush 12 until the bush has been inserted into the cylinder bore 14 of the pump housing 16. Once the bush 12 has been inserted into the pump housing 16, the piston 20 can still be guided by the filter ring 88 in the pump housing 16, but preferably the guide ring 26 inserted into the pump housing 16 takes on this task instead. The filter ring 88, forming the piston guide, of the filter 82 prevents the piston 20 from becoming skewed in the bush 12 and assures that the piston 20, upon insertion of the bush 12 into the cylinder bore 14 of the pump housing 16, will not strike the sealing ring 28 inserted into the pump housing 16 but instead will enter into the sealing ring 28 and the guide ring 26.

The filter ring 90 with the V-shaped bead 84 rests sealingly in the V-shaped groove 80 of the bush 12, so that no fluid aspirated by the piston pump 10 can reach the bush 12 unfiltered. The other filter ring 88 rests sealingly on the cylinder bore 14 of the pump housing 16. Fluid flowing into the piston pump 10 passes between the filter ring 90 having the V-shaped bead 84 and the piston 20 and also through the groove 34 in the piston 20 into the transverse bore 32 of the piston 20.

The filter 82 acts at the same time as a loss-prevention means for the piston 20 in the bush 12: From the filter ring 90 placed in the V-shaped groove of the bush 12, spring tongues 96 protrude obliquely inward, approximately on an imaginary conical surface, into the bush 12. The spring tongues 96 are circumferentially spaced apart. The spring tongues 96 are integral with the filter ring 90. The spring tongues 96, which form the loss-prevention means for the piston 20, protrude into the groove 34 in the piston 20; that is, free ends of the spring tongues 96 that are oriented toward the bush bottom 18 are located radially inside an imaginary piston jacket face.

A groove side 98 of the groove 34 in the piston 20 forms an undercut, which cooperates with the spring tongues 96: Until the insertion of the bush 12 into the cylinder bore 14 of the pump housing 16, the piston restoring spring 54 presses the piston 20 with its groove side 98 forming the undercut into contact with the spring tongues 96, which engage the groove side 98 from behind. In this way, the spring tongues 96 hold the piston 20 in the bush 12 counter to the force of the restoring spring 54; the piston 20 cannot be pulled out of the bush 12.

Upon assembly of the piston pump 10 of the invention, the filter 82 forming the loss-prevention means is slipped onto the piston 20 until the spring tongues 96 yield into the groove 34 of the piston 20. This means that the spring tongues 96 of the loss-prevention means engage the groove side 98 of the groove 34 of the piston 20 from behind. For mounting the filter 82; the piston 20 is provided, on its face end toward the eccentric element 56, with a chamfer 100, which spreads the spring tongues 96 apart when the filter 82, forming the loss-prevention means, is slipped onto the piston 20.

The piston 20 with the filter 82 slipped onto it is introduced, together with the guide ring 22 and sealing ring 24 slipped onto the piston 20, the inlet valve 38 mounted on the face end of the piston 20, and the piston restoring spring 54, into the bush 12. In this process, the obliquely inward-protruding spring tongues 96 of the filter 82 enter an orifice of the bush 12 and are radially compressed. Via the spring tongues 96, the filter ring having the V-shaped bead 84 is also elastically radially compressed. For compressing the spring tongues 96 and the filter ring 90, the groove 34 offers free space radially inward in the piston 20. Because of its elasticity, the filter ring 90 widens again on reaching the V-shaped groove 80 in the bush 12 and is retained in the manner of a snap connection in the bush 12 and in turn secures the piston 20 in the bush 12 counter to the force of the piston restoring spring 54.

Once the closure element 62, with the outlet valve 64 inserted into the closure element 62, has been mounted on the bush bottom 18 by means of the crimp 58, the complete preassembled unit, with the bush 12, the piston 20 inserted captively into it, and the closure element 62, is press-fitted into the cylinder bore 14 of the pump housing 16 and then fixed in pressure-tight fashion in the pump housing 16 by means of a caulking 102 of the pump housing 16 at the closure element 62. The closure element 62 can be mounted on the bush 12 either before or after the piston 20 is inserted into the bush 12.

For the sake of clarity, it will be noted that the angular sections shown in the drawing are angled at the imaginary axis in such a way that in the left half of each drawing, the section passes through a filter window 92 and a spring tongue 96, while in the right half of the drawing the section intersects a filter strut 86 and passes between two spring tongues 96.

The face end of the spring tongues 96 of the filter 82 toward the groove side 98 forms a first axial stop associated with the bush 12. The groove side 98, which on its face end is toward the filter 82, of the piston 20 forms a second axial stop associated with the piston 20. Before the preassembled unit, including the piston 20, bush 12 and filter 82, is inserted into the pump housing 16, the loss-prevention means acts in such a way that the piston 20 can be moved out of the bush 12 only far enough that the stop associated with the piston 20 comes into contact with the stop associated with the bush 12. Once the preassembled unit has been installed in the pump housing 16, the outward stroke of the piston 20 is limited by the eccentric element 56.

The foregoing relates to a preferred exemplary embodiment of the invention, it being understood that other variants and embodiments thereof are possible within the spirit and scope of the invention, the latter being defined by the appended claims.

We claim:

1. A piston pump comprising a pump housing, a piston which is driven to execute a reciprocating stroke motion and which is received axially displaceably over at least part of a piston length in a bush which is insertable into said pump housing, a loss-prevention means for the piston, said loss-prevention means is mounted on the bush and engages an undercut of the piston from behind, and the undercut is made inside a piston circumference on the piston, the loss-prevention means is embodied resiliently in a radial direction and automatically enters into engagement with the undercut.

2. The piston pump according to claim 1, in which the piston (20) protrudes axially from the bush (12) for a part of the length of the piston and, both inside the bush (12) and outside the bush (12), has a rated diameter which is equivalent to an inside diameter of the bush (12).

3. The piston pump according to claim 1, in which the undercut (98) of the piston (20) is formed by a groove side of a groove (34) extending around a circumference of the piston.

4. The piston pump according to claim 3, in which the bush (12) has a groove (80) extending completely around an inside circumferential face into which the loss-prevention means (82, 84, 90, 96) is inserted.

5. The piston pump according to claim 1, in which the loss-prevention means (90, 96) is embodied to annularly encompass the piston (20).

6. The piston pump according to claim 1, in which the loss-prevention means has at least one spring tongue (96), which engages the undercut (98) of the piston (20) from behind.

7. The piston pump according to claim 1, in which the loss-prevention means (84, 90, 96) is a component of a hollow-cylindrical filter (82), which is mounted to surround the piston (20), on the bush (12) in an axial extension of the bush (12).

8. The piston pump according to claim 7, in which the filter (82) has a guide (88) for the piston (20).

9. The piston pump according to claim 1, in which a guide (88) that guides the piston (20) is formed onto the loss-prevention means (82, 98).

10. A piston pump comprising a pump housing, a piston which is driven to execute a reciprocating stroke motion and which is received axially displaceably over at least part of a piston length in a bush which is insertable into said pump housing, and a loss-prevention means is mounted on the piston, said loss-prevention means engages an undercut of the bush and secures the piston in the bush, the loss-prevention means is embodied resiliently in a radial direction and automatically enters into engagement with the undercut.

11. The piston pump according to claim 10, in which the piston (20) protrudes axially from the bush (12) for a part of the length of the piston and, both inside the bush (12) and outside the bush (12), has a rated diameter which is equivalent to an inside diameter of the bush (12).

12. The piston pump according to claim 10, in which the undercut of the bush (12) is formed by a groove side of a groove (80) extending around the bush (12).

13. The piston pump according to claim 10, in which the loss-prevention means (90, 96) is embodied to annularly encompass the piston (20).

14. The piston pump according to claim 10, in which a guide (88) that guides the piston (20) is formed onto the loss-prevention means (82, 98).

* * * * *